United States Patent
Ueshima (10) Patent No.: US 8,374,541 B2
(45) Date of Patent: Feb. 12, 2013

(54) GROUP RESPONSE DETECTING SYSTEM, COMMUNICATION SYSTEM, INPUT DEVICE AND COMMUNICATION CONTROL DEVICE

(75) Inventor: Hiromu Ueshima, Shiga (JP)

(73) Assignee: SSD Company Limited, Shiga (JP)

( * ) Notice: Subject to any disclaimer, the term of this patent is extended or adjusted under 35 U.S.C. 154(b) by 1026 days.

(21) Appl. No.: 12/362,446

(22) Filed: Jan. 29, 2009

(65) Prior Publication Data

US 2009/0215481 A1 Aug. 27, 2009

(30) Foreign Application Priority Data

Feb. 1, 2008 (JP) .................................. 2008-022202

(51) Int. Cl.
H04H 60/21 (2008.01)
H04H 60/33 (2008.01)
H04H 60/61 (2008.01)
H04H 20/71 (2008.01)

(52) U.S. Cl. .................... 455/2.01; 455/426.1; 455/462; 455/3.01

(58) Field of Classification Search ................. 455/2.01, 455/13, 517, 519, 416, 3.01, 426.1, 462
See application file for complete search history.

(56) References Cited

U.S. PATENT DOCUMENTS

| | | | | |
|---|---|---|---|---|
| 4,805,020 A * | 2/1989 | Greenberg | .................... | 348/460 |
| 7,379,705 B1 * | 5/2008 | Rados et al. | ................. | 455/2.01 |
| 7,657,223 B2 * | 2/2010 | Kauppinen | .................. | 455/3.03 |
| 7,924,759 B1 * | 4/2011 | LaBella et al. | ................. | 370/312 |
| 8,150,429 B1 * | 4/2012 | Zheng | ........................... | 455/466 |
| 2005/0181722 A1 * | 8/2005 | Kopra et al. | ................. | 455/2.01 |
| 2007/0283379 A1 * | 12/2007 | Earl | ............................... | 725/13 |
| 2008/0108298 A1 * | 5/2008 | Selen et al. | .................. | 455/2.01 |

\* cited by examiner

*Primary Examiner* — Tilahun B Gesesse
(74) *Attorney, Agent, or Firm* — Jackson Patent Law Office (57) ABSTRACT

A plurality of nodes 2-*n* are assigned to a plurality of operators. The each node 2-*n* detects input operation of the corresponding operator to transmit detection information in a wireless manner. A host 27 receives the detection information transmitted in the wireless manner by the each node 2-*n*. The host 27 transmits a beacon signal BS to the plurality of the nodes 2-*n* in a predetermined cycle CY. The each node 2-*n* performs processing of detecting the input operation while changing time, i.e., at times ST0 to ST3 to transmit the detection information to the host 27 in response to the beacon signal BS. It is possible to finely detect order of changes of the detection information among the plurality of the nodes.

21 Claims, 8 Drawing Sheets

FIG. 1

FIG. 4A Beacon
FIG. 4B Scan

GROUP RESPONSE DETECTING SYSTEM, COMMUNICATION SYSTEM, INPUT DEVICE AND COMMUNICATION CONTROL DEVICE

BACKGROUND OF THE INVENTION

1. Field of the Invention

The present invention relates to a group response detecting system, a communication system, and the related arts for connecting a host with a plurality of nodes in a wireless manner to transmit detection information of the each node to the host.

2. Description of the Related Art

Patent Document (Japanese Unexamined Utility Model Application Publication NO. SHO61-50986) discloses an answer counting system which consists of a plurality of answering devices (nodes) and one receiver (host). The answering devices and the receiver are connected with each other in a wireless manner. The each answering device transmits a radio wave to the receiver when a button with a circle mark is depressed. Then, the receiver counts and displays the number of arrivals of the transmitted radio wave.

However, in the above system, the receiver does not detect order of depression of the button of the each answering device, i.e., order of change of input information of the each answering device. Also, in the case where order is competed, it is preferable that order of the depression of the button of the each answering device is detected finely as much as possible.

SUMMARY OF THE INVENTION

It is therefore an object of the present invention to provide a group response detecting system and the related techniques thereof capable of detecting finely order of changes of detection information among a plurality of nodes.

It is an another object of the present invention to provide a group response detecting system and the related techniques thereof capable of detecting correctly order of changes of detection information among a plurality of nodes even if a communication error occurs.

It is a further object of the present invention to provide a communication system and the related techniques thereof whose node is capable of transmitting detection information to a host even if the node can not receive a predetermined signal due to a communication error in the case where the node performs transmission process in response to the predetermined signal from the host.

It is a still further object of the present invention to provide a communication system and the related techniques thereof capable of realizing one-to-many communication simply without cross talk.

In accordance with a first aspect of the present invention, a group response detecting system, comprising: a plurality of nodes to be assigned to a plurality of operators, said each node detects input of the corresponding operator to transmit detection information in a wireless manner; and a host operable to receive the detection information transmitted by said each node, wherein said host transmits a predetermined signal to said plurality of the nodes in a predetermined cycle, and wherein said each node includes: a detection unit operable to perform detecting processing of the input a plurality of times while changing time during the one cycle, and a transmitter operable to transmit the detection information to said host in response to the predetermined signal.

In accordance with this configuration, while each node transmits the detection information in response to the predetermined signal transmitted in the predetermined cycle, since the plurality of times of the detecting processing is performed while changing time during one cycle, it is possible to recognize at which point of time during the one cycle the detecting processing detects the change of the detection information (e.g., change from an OFF state to an ON state of a switch). Besides, in the case where the detecting processing is performed once during the one cycle (e.g., at the time when the predetermined signal is received), the cycle in which the change of the detection information is detected is just recognized, i.e., the recognition is made only in units of a cycle.

In accordance with the present invention, since it is possible to recognize, for each node, a point of time in a cycle at which the detecting processing detects the change of the detection information as well as the cycle in which the change of the detection information is detected, the host side can finely detect the order of the changes of the detection information among the plurality of the nodes (e.g., the order of the depressions of the switches). Besides, in the case where the detection processing is performed once time in one cycle, the order of the changes is just recognized in units of a cycle.

In this group response detecting system, said transmitter transmits information (hereinafter referred to as "time point information") indicating at which point of time during the one cycle the detecting processing detects the detection information, together with the detection information to said host in response to the predetermined signal.

In accordance with this configuration, by means of the time point information, it is possible to recognize for each node at which point of time during one cycle the detecting processing detects the change of the detection information.

In the above group response detecting system, said transmitter transmits information indicating the cycle in which the detection information is detected, together with the detection information to said host in response to the predetermined signal.

In accordance with this configuration, by means of the information indicating the cycle in which the change of the detection information is detected, it is possible to recognize for each node the cycle in which the change of the detection information is detected.

In the above group response detecting system, the predetermined signal includes information (hereinafter referred to as "signal identification information") for identifying the predetermined signal, wherein said each node further includes a storage unit operable to store the detection information associated with the signal identification information and the time point information, wherein when the detection unit detects change of the detection information, said storage unit rewrites the detection information, the signal identification information, and the time point information as stored to the detection information as changed, and the signal identification information and the time point information included in the predetermined signal in the cycle in which the change is detected, and wherein said transmitter transmits the detection information, the signal identification information, and the time point information as stored in the storage unit to said host in response to the predetermined signal.

In accordance with this configuration, the invention has the similar advantages as the group response detecting system in accordance with the second aspect as described below.

Incidentally, the signal identification information is information for identifying the predetermined signal. Moreover, the predetermined signal is transmitted in the predetermined cycle. Accordingly, the signal identification information can be also used as the information for identifying the cycle.

In this group response detecting system, said each node further includes an identification information generation unit operable to generate the signal identification information anew based on the signal identification information included in the predetermined signal as received previously when the predetermined signal is not received, and wherein when the detection unit detects the change of the detection information during the cycle in which the predetermined signal is not received, said storage unit rewrites the detection information, the signal identification information, and the time point information as stored to the detection information as changed, the signal identification information generated by said identification information generation unit, and the time point information.

In accordance with this configuration, the invention has the similar advantages as the group response detecting system in accordance with the second aspect as described below.

In accordance with a second aspect of the present invention, a group response detecting system, comprising: a plurality of nodes to be assigned to a plurality of operators, said each node detects input of the corresponding operator to transmit detection information in a wireless manner; and a host operable to receive the detection information transmitted by said each node, wherein said host transmits a predetermined signal to said plurality of the nodes in a predetermined cycle, wherein the predetermined signal includes information (hereinafter referred to as "signal identification information") for identifying the predetermined signal, and wherein said each node includes: a detection unit operable to perform detecting processing of input during the one cycle, a storage unit operable to store the detection information associated with the signal identification information, and a transmitter operable to transmit the detection information and the signal identification information stored in said storage unit to said host in response to the predetermined signal, wherein when said detection unit detects change of the detection information, said storage unit rewrites the detection information and the signal identification information as stored to the detection as changed and the signal identification information included in the predetermine signal in the cycle in which the change is detected.

In accordance with this configuration, since the detection information and the signal identification information are updated when the change of the detection information is detected, the detection information and the signal identification information transmitted by the node are always information at a point of time at which the detection information changes regardless of the past change and the current change. Accordingly, even if the host can not correctly receive the detection information and the signal identification information from the node due to the communication error, by means of the signal identification information transmitted next by the node, it is possible to recognize a cycle in which the detection information changes. As the result, even if the communication error occurs, the host side can correctly detect the order of the changes of the detection information among the plurality of the nodes (e.g., the order of the depressions of the switches).

For example, it is assumed that the detection information of the first cycle changes in the next second cycle, and the detection information and the signal identification information are updated in the second cycle. Also, it is assumed that the detection information of the second cycle does not change in the next third cycle, and the detection information and the signal identification information of the second cycle are maintained. Then, it is assumed that the detection information and the signal identification information to be received in the second cycle by the host are correctly received. However, the host side can recognize that a time when the detection information changes is in the second cycle by means of the signal identification information transmitted in the third cycle.

Also, even if the host can not correctly receive the detection information and the signal identification information from the node due to the communication error, by means of the signal identification information transmitted next by the node, it is possible to recognize a cycle from which the same detection information continues.

Incidentally, the signal identification information is information for identifying the predetermined signal. Moreover, the predetermined signal is transmitted in the predetermined cycle. Accordingly, the signal identification information can be also used as the information for identifying the cycle.

In this group response detecting system, said each node further includes a identification information generation unit operable to generate the signal identification information anew based on the signal identification information included in the predetermined signal as received previously when the predetermined signal is not received, and wherein when the detection unit detects the change of the detection information during the cycle in which the predetermined signal is not received, said storage unit rewrites the detection information and the signal identification information as stored to the detection information as changed and the signal identification information generated by said identification information generation unit.

In accordance with this configuration, even if the node can not receive the predetermined signal due to the communication error, the node generates the signal identification information internally. Accordingly, even if the detection information changes in the cycle, the signal identification information as generated is transmitted together with the detection information to the host. As the result, even if the communication error occurs, the host side can correctly detect the order of the changes of the detection information among the plurality of the nodes (e.g., the order of the depressions of the switches).

Also, even if the node can not receive the predetermined signal from the host due to the communication error, by means of the signal identification information generated by the node, the host side can recognize a cycle from which the same detection information continues.

In this group response detecting system, when the predetermined signals are not received in series, said identification information generation unit generates the signal identification information anew based on the signal identification information as generated previously.

In accordance with this configuration, even if the node can not receive the predetermined signal continuously, the host side can correctly detect the order of the changes of the detection information among the plurality of the nodes, and recognize a cycle from which the same detection information continues.

In the above group response detecting system, said each node further includes a maintenance unit operable to maintain the predetermined cycle substantially when the predetermined signal is not received, and wherein said transmitter performs transmitting processing based on the cycle maintained by said maintenance unit when the predetermined signal is not received.

In accordance with this configuration, the invention has the similar advantages as the communication system in accordance with the third aspect as described below.

In the above group response detecting system, said transmitter of said each node performs transmitting processing after a different time period assigned to said each node elapses from when the predetermined signal is received.

In accordance with this configuration, the invention has the similar advantages as the communication system in accordance with the fourth aspect as described below.

In accordance with a third aspect of the present invention, a communication system, comprising: a plurality of nodes to be assigned to a plurality of operators, said each node detects input of the corresponding operator to transmit detection information in a wireless manner; and a host operable to receive the detection information transmitted by said each node, wherein said host transmits a predetermined signal to said plurality of the nodes in a predetermined cycle, and wherein said each node includes: a detection unit operable to perform detecting processing of input during the one cycle, a transmitter operable to transmit the detection information to said host in response to the predetermined signal, and a maintenance unit operable to maintain the predetermined cycle substantially when the predetermined signal is not received, wherein said transmitter transmits the detection information to said host based on the cycle maintained by said maintenance unit when the predetermined signal is not received.

In accordance with this configuration, even if the node can not receive the predetermined signal due to the communication error, since the cycle is maintained inside the node, it is possible to transmit the detection information to the host.

In this communication system, said transmitter of said each node performs transmitting processing after a different time period assigned to said each node elapses from when the predetermined signal is received or from a head of the cycle.

In accordance with this configuration, the invention has the similar advantages as the communication system in accordance with the fourth aspect as described below.

In accordance with a fourth aspect of the present invention, a communication system, comprising: a plurality of nodes to be assigned to a plurality of operators, said each node detects input of the corresponding operator to transmit detection information in a wireless manner; and a host operable to receive the detection information transmitted by said each node, wherein said host transmits a predetermined signal to said plurality of the nodes in a predetermined cycle, and wherein said each node includes: a detection unit operable to perform detecting processing of input during the one cycle, and a transmitter operable to transmit the detection information to said host in response to the predetermined signal after an assigned waiting time elapses, wherein the waiting time different from one another is assigned for said each node.

In accordance with this configuration, since the different waiting time is assigned to each node, it is possible to realize one-to-many communication simply without cross talk.

In accordance with a fifth aspect of the present invention, an input device comprising: a node as included in any one of the group response detecting system in accordance with the first aspect, the group response detecting system in accordance with the second aspect, the communication system in accordance with the third aspect, and the communication system in accordance with the fourth aspect.

In accordance with a sixth aspect of the present invention, a communication control device comprising: a host as included in any one of the group response detecting system in accordance with the first aspect, the group response detecting system in accordance with the second aspect, the communication system in accordance with the third aspect, and the communication system in accordance with the fourth aspect.

BRIEF DESCRIPTION OF THE DRAWINGS

The novel features of the present invention are set forth in the appended any one of claims. The invention itself, however, as well as other features and advantages thereof, will be best understood by reference to the detailed description of specific embodiments which follows, when read in conjunction with the accompanying drawings, wherein:

DESCRIPTION OF THE PREFERRED EMBODIMENTS

In what follows, an embodiment of the present invention will be explained in conjunction with the accompanying drawings. Meanwhile, like references indicate the same or functionally similar elements throughout the respective drawings, and therefore redundant explanation is not repeated.

In the embodiment, a task for training a prefrontal cortex in a brain (referred to as the "training task" in the following description) is displayed on a screen. Then, a plurality of operators replies thereto. The each operator competes to get a correct answer as quickly as possible.

Figure 1:
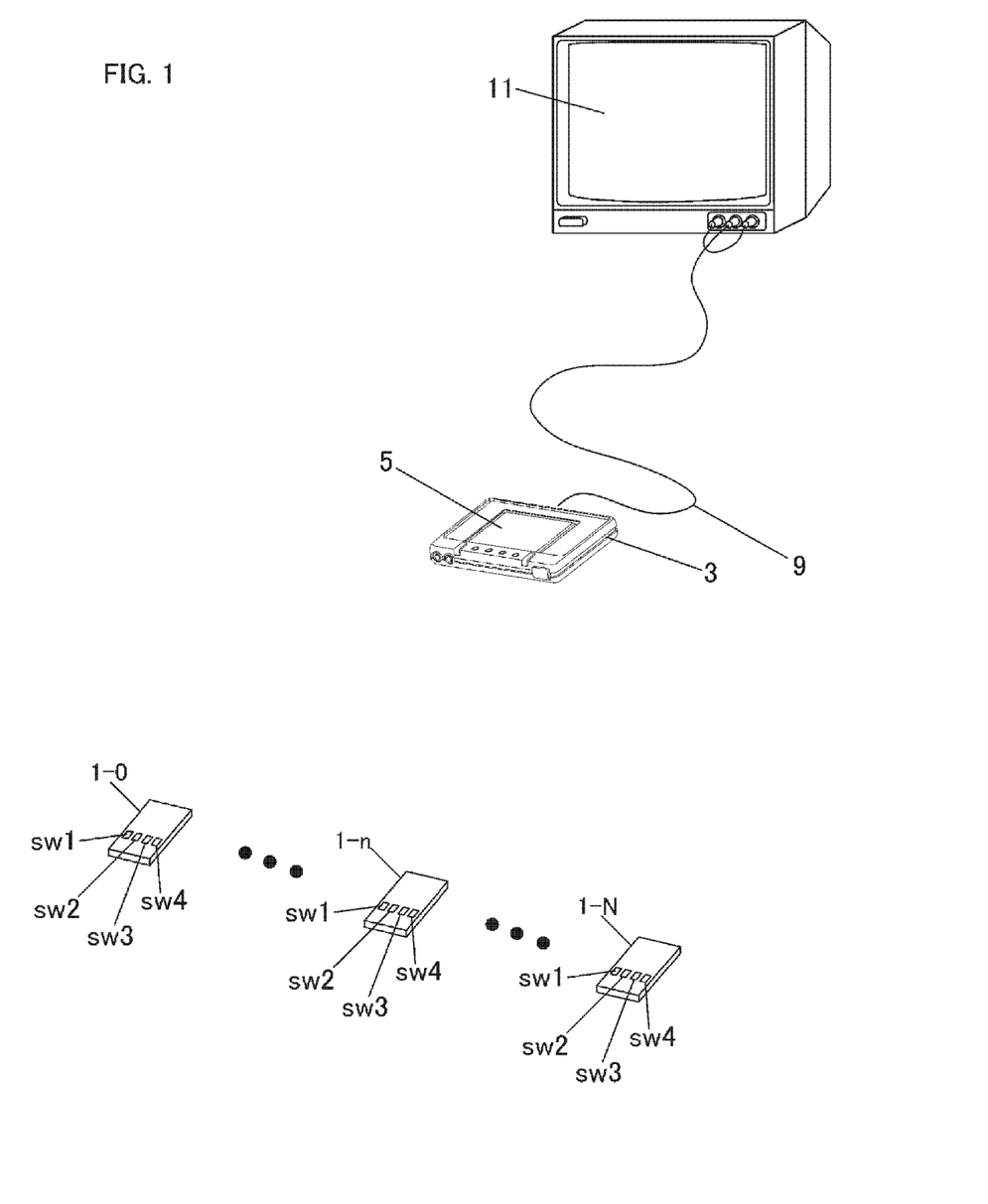
FIG. 1 is a view showing the overall configuration of a group response detecting system in accordance with an embodiment of the present invention.

FIG. 1 is a view showing the overall configuration of a group response detecting system in accordance with an embodiment of the present invention (may be referred to as the "communication system"). Referring to FIG. 1, the group response detecting system is provided with hand-input-type input devices 1-0 to 1-N ("N" is one or more integer) each of which has four switches sw1 to sw4, an adapter 3, a cartridge 5, and a television monitor 11. The input devices 1-0 to 1-N may be generally referred to as the "input device 1-n ("n" is one of 0 to N)". In what follows, an example in which N is 49 will be cited. Also, the switches sw1 to sw4 may be generally referred to as the "switches sw". Incidentally, the adapter 3, the cartridge 5, and the input devices 1-n constitute a group response detecting apparatus (may be referred to as the "communication apparatus").

The cartridge 5 is inserted into the adaptor 3. Also, the adapter 3 includes a power supply circuit, which supplies the cartridge 5 with a power supply voltage. Also, the adaptor 3 is connected with the television monitor 11 via an AV cable 9. Accordingly, a video signal VD and an audio signal AU generated by the cartridge 5 are sent to the television monitor 11 through the adapter 3 and the AV cable 9. As the result, the television monitor 11 displays various screens, and outputs sound from a speaker (not shown in the figure) thereof.

The respective input devices 1-n are assigned to the operators. Since the training task is displayed on the television monitor 11, the plurality of the operators looks at the training task to answer by operating the respective input devices 1-n. In this case, since the order of the person who gets a correct answer earlier is higher, the each operator tries to depress the switch SW as quickly as possible when he/she gets the correct answer.

Figure 2:
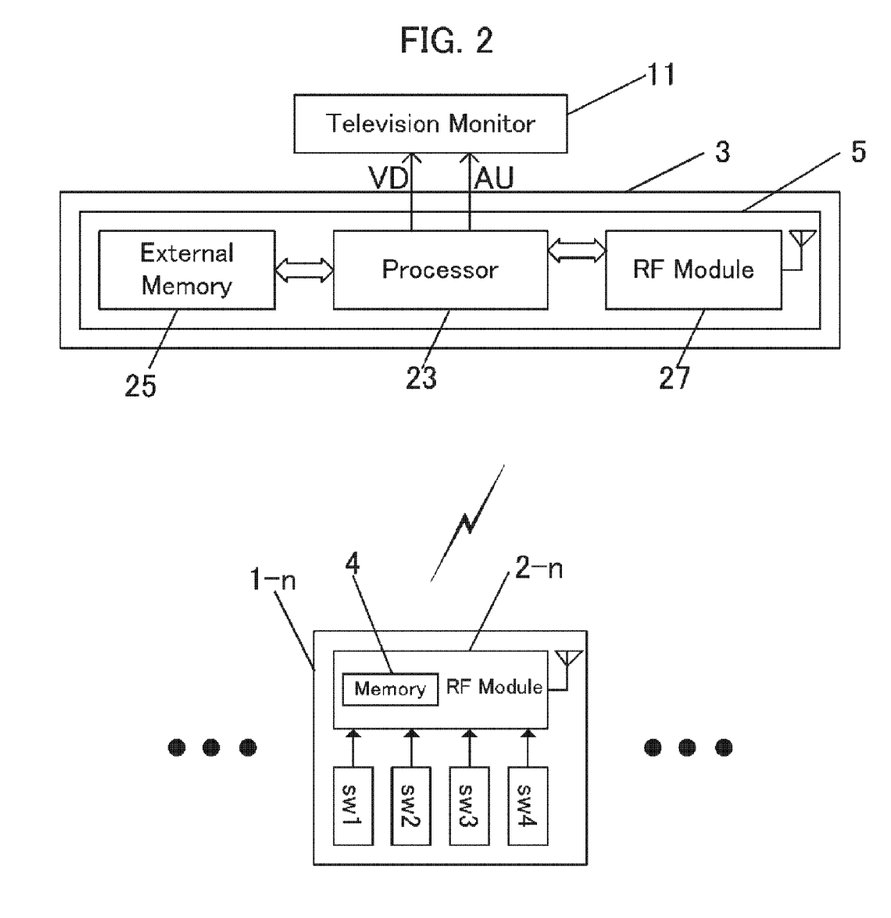
FIG. 2 is a view for showing the electrical construction of the group response detecting system of FIG. 1.

FIG. 2 is a view for showing the electrical construction of the group response detecting system of FIG. 1. Referring to FIG. 2, the cartridge 5 includes a processor 23, an RF (Radio Frequency) module 27, and an external memory 25 (e.g., a RAM, a ROM, and/or a flash memory, and so forth). The input device 1-n includes the four switches sw1 to sw4, and an RF module 2-n. The RF module 2-n includes an internal memory 4 (e.g., a RAM, a ROM, and/or a flash memory, and so forth).

Incidentally, the RF module 27 of the cartridge 5 may be referred to as the "host (communication control device) 27". Also, the input device 1-n may be referred to as the "node (terminal) 1-n", or the RF module 2-n of the input device 1-n may be referred to as the "node 2-n".

The RF module 2-n of the input device 1-n scans the switches sw1 to sw4 to acquire ON/OFF information (referred to as the "status information" in the following description) of the switches sw1 to sw4 based on operation of the operator, and then transmits the status information of the switches sw1 to sw4 to the RF module 27 of the cartridge 5 in the wireless manner. Then, the RF module 27 sends the status information of the switches sw1 to sw4 as received to the processor 23.

The processor 23 is connected with the external memory 25. The external memory 25 includes a program area, an image data area, and a sound data area. The program area stores control programs (including application programs which execute indication and evaluation of the training tasks). The image data area stores all image data items constituting various screens to be displayed on the television monitor 11, and the other necessary image data items. The sound data area stores sound data items. The processor 23 executes the control program stored in the program area, reads the image data stored in the image data area and the sound data stored in the sound data area, and applies necessary processing thereto to generate the video signal VD and the audio signal AU. The video signal VD and the audio signal AU are supplied to the television monitor 11 through the adapter 3 and the AV cable 9. As the result, the various screens are displayed on the television monitor 11 and simultaneously the sound is output, and the operators perform the tasks indicated by the screens and the sound. Also, the processor 23 performs the evaluation with respect to the indicated task based on the status information of the switches sw1 to sw4 as received, and generates the video signal VD and the audio signal AU which represent the screen and sound as the result to output them to the television monitor 11.

Although not shown in the figure, the processor 23 includes various functional blocks, such as a CPU (central processing unit), a graphics processor, a sound processor and a DMA controller and so forth, and in addition to this, includes an A/D converter for receiving analog signals, an input/output control circuit for receiving input digital signals such as key manipulation signals and infrared signals (the status information of the switches sw1 to sw4 in the present embodiment) and giving the output digital signals to external devices, an internal memory, and so on.

The CPU executes the control program stored in the external memory 25. The digital signal from the A/D converter and the digital signal from the input/output control circuit are given to the CPU, and then the CPU executes necessary operation in accordance with these signals based on the control program. The graphics processor applies graphics processing required by the operation result of the CPU to the image data stored in the external memory 25 to generate the video signal VD corresponding to a picture to be displayed on the television monitor 11. The sound processor applies sound processing required by the operation result of the CPU to the sound data stored in the external memory 25 to generate the audio signal AU corresponding to necessary sound. For example, the internal memory is a RAM, and is used as a working area, a counter area, a register area, a temporary data area, a flag area and/or the like area.

Figure 3A:
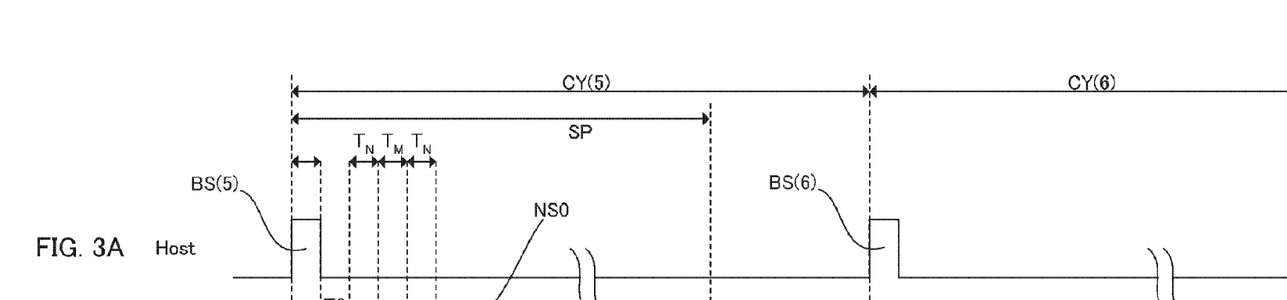
FIGS. 3A to 3C are explanatory views for showing communication method between a cartridge 5 and input devices 1-n of FIG. 1.
Figure 3B:
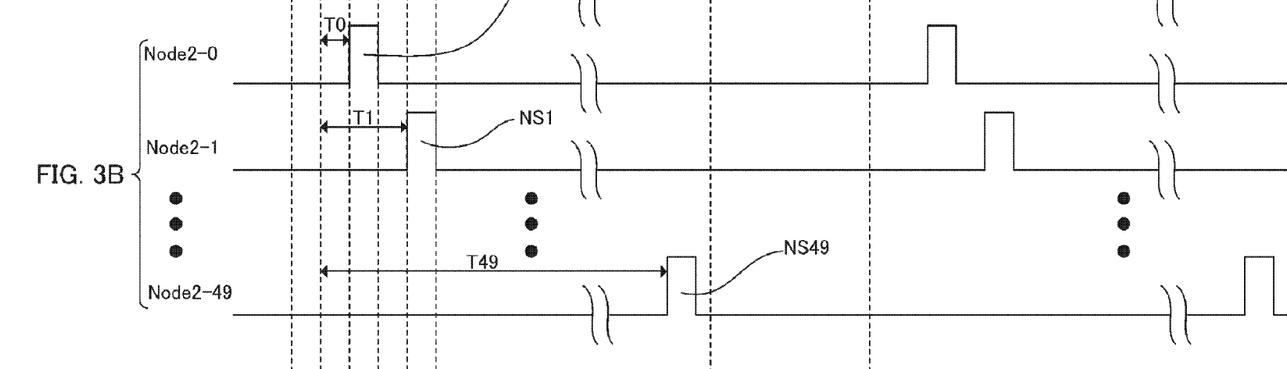
Figure 3C:
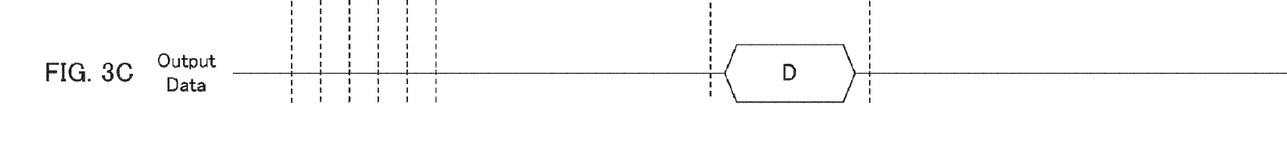

FIGS. 3A to 3C are explanatory views for showing communication method between the cartridge 5 and the input devices 1-n of FIG. 1. Referring to FIG. 3A, the host 27 (RF module 27) transmits a beacon signal BS ( ) to all the nodes 2-0 to 2-49 (RF modules 2-0 to 2-49). The beacon signal ( ) includes a beacon ID which is identification information of the beacon signal ( ). In this case, number shown in the parentheses attached to the reference "BS" indicates the beacon ID.

As shown in FIG. 3B, waiting times T0 to T49 are assigned to the nodes 2-0 to 2-49 respectively. If it is generally expressed, the waiting time $T(n) = T(n-1) + T_N + T_M$.

In this case, $T(0) = T0$.

The variable $T_N$ indicates a transmission time period of a status signal NSn to be transmitted by the node 2-n, and the variable $T_M$ indicates a time period as a margin. The node 2-n stores the waiting time T (n) assigned thereto in the internal memory thereof. The status signal NSn includes the status information of the switches sw1 to sw4 of the input device 1-n, the beacon ID, and a scan number (corresponding to "time point information") as described below.

The node 2-0 starts to transmit the status signal NS0 to the host 27 at the time when the assigned waiting time T0 elapses from when the reception of the beacon signal BS is finished, and finishes the transmission during the time period $T_N$. Next, the node 2-1 starts to transmit the status signal NS1 to the host 27 at the time when the assigned waiting time T1 elapses from when the reception of the beacon signal BS is finished, and finishes the transmission during the time period $T_N$. Subsequently, in the same manner, the respective nodes 2-2 to 2-49 wait for elapsing of the assigned waiting times T (n), and then transmits the status signals NS2 to NS49 to the host 27 in order.

Then, as shown in FIG. 3C, the host 27 outputs data D, which includes the status signals NS0 to NS49 from all the input device 1-0 to 1-49, to the processor 23 after a predetermined time elapses from when the reception of the status signal NS49 from the node 2-49 is finished.

The communication between the host 27 and the nodes 2-n as described above is repeated in units of one cycle CY ( ). In this case, number shown in the parentheses attached to the reference "CY" is number assigned to each cycle for the sake of clarity in explanation.

Figures 4A, 4B:
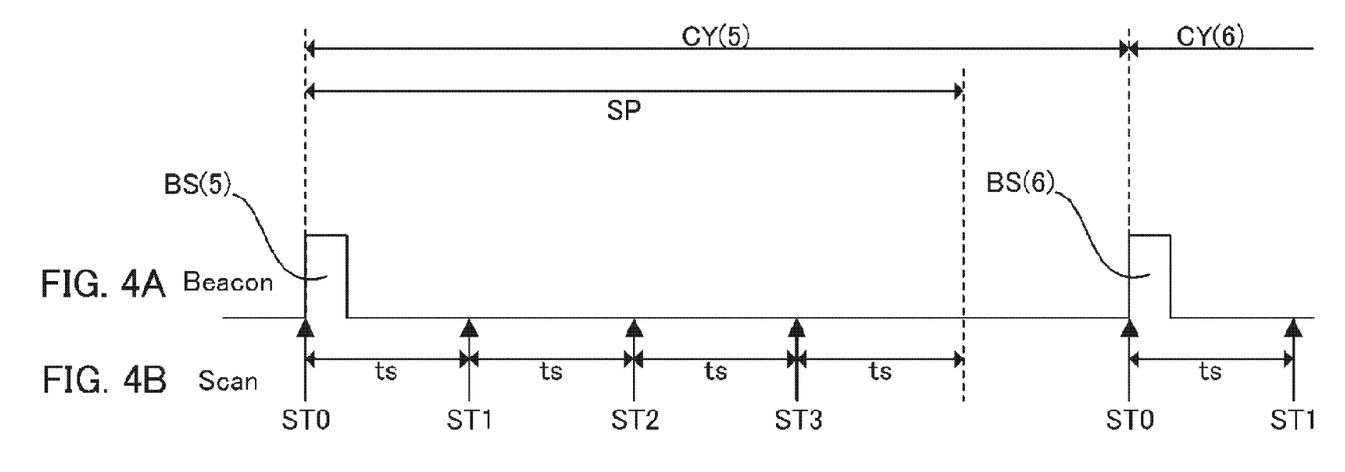
FIGS. 4A and 4B are explanatory views for showing status information, a beacon ID, and a scan number which the input device 1-n of FIG. 1 includes in a status signal NSn.

FIGS. 4A and 4B are explanatory views for showing the status information (corresponding to "detection information"), the beacon ID (corresponding to "signal identification information"), and the scan number (corresponding to "time point information") which the node 2-n includes in the status signal NSn. Referring to FIG. 4A, it is assumed that the one cycle (CY (5)) is a period from the time of the reception of one beacon signal (BS (5)) to the time of the reception of the next beacon signal (BS (6)). As shown in FIG. 4B, the node 2-n scans the switches sw1 to sw4 four times during one cycle (CY (5)). Specifically, the node 2-n scans the switches sw1 to sw4 at the time ST0 when the beacon signal (BS (5)) is received, at the time ST1 when the time ts elapses after the reception time ST0, at the time ST2 when the time ts elapses after the time ST1, and at the time ST 3 when the time ts elapses after the time ST2. The times ST0 to ST3 may be referred to as the "scan times ST0 to ST3". In this case, for example, the time "ts" is a value obtained by dividing a time period SP (see FIGS. 3A to 3C) by 4. The time period SP indicates until just before the output of the data D is started from when the beacon signal (BS (5)) is received.

The node 2-n stores the status information of the switches sw1 to sw4, the beacon ID, and the scan number in a temporal buffer (not shown in the figure) of the internal memory 4. In this case, the node 2-n compares the status information at the current scan time (e.g., ST1) with the status information at the previous scan time (e.g., ST0). As the result of the comparison, when the status information changes, the node-n rewrites the status information stored in the temporal buffer to the status information at the current scan time. In this case, the status information at the first scan time ST0 in the cycle (CY (5)) is compared with the status information at the last scan time ST3 in the previous cycle (CY (4)).

When the status information stored in the temporal buffer is rewritten, the node 2-n rewrites the beacon ID stored in the temporal buffer to the beacon ID of the beacon signal (BS (5)) as received in the cycle (CY (5)) in which the rewriting operation is executed, and rewrites the scan number stored in the temporal buffer to the scan number indicating the current scan time (the scan time in the time when the rewriting operation is executed). Incidentally, for example, the scan times ST0 to ST3 are represented by the scan numbers 0 to 3 respectively.

The node 2-n copies final data (the status information, the beacon ID, and the scan number) stored in the temporal buffer in the current cycle (CY (5)) onto a transmission buffer (not shown in the figure) of the internal memory 4, and transmits the status signal NSn including the final data stored in the transmission buffer to the host 27 in the next cycle (CY (6

Figure 5:
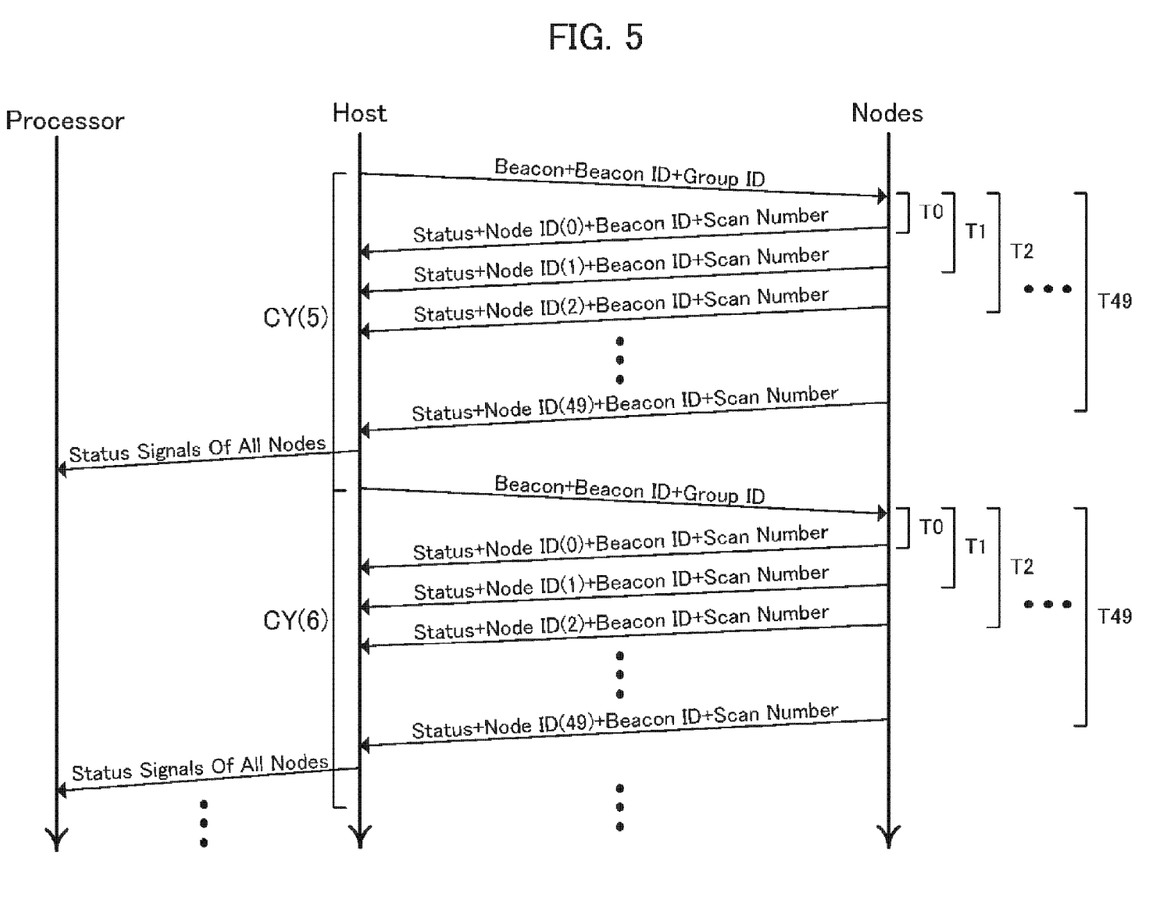
FIG. 5 is a view for showing a communication procedure among a processor 23, a host 27, and nodes 2-n of FIG. 2.

FIG. 5 is a view for showing a communication procedure among the processor 23, the host 27, and the nodes 2-n of FIG. 2. Referring to FIG. 5, the host 27 transmits the beacon signal BS to the nodes 2-n. The beacon signal BS includes a group ID as well as the above beacon ID. The group ID is identification information for distinguishing this system (the host 27 and the nodes 2-n linked therewith) from the other system (the other host and nodes linked therewith).

Each node 2-n receives the beacon signal BS, and then transmits the status signal NSn to the host 27 after the waiting time T (n) assigned to the each node 2-n elapses. The status signal NSn includes a node ID as well as the above status information, the beacon ID, and the scan number. The node ID ( ) is identification information for distinguishing the nodes 2-0 to 2-49 from one another. The number shown in the parentheses attached to the reference "ID" is a value of the node ID.

When the reception of the status signals NSn from all the nodes 2-n is finished, the host 27 transmits them to the processor 23. Also, the host 27 transmits the beacon signal BS to the nodes 2-n for each cycle CY. In this case, the waiting times T (0) to T (49) indicate the waiting times T0 to T49 respectively.

Figure 6:
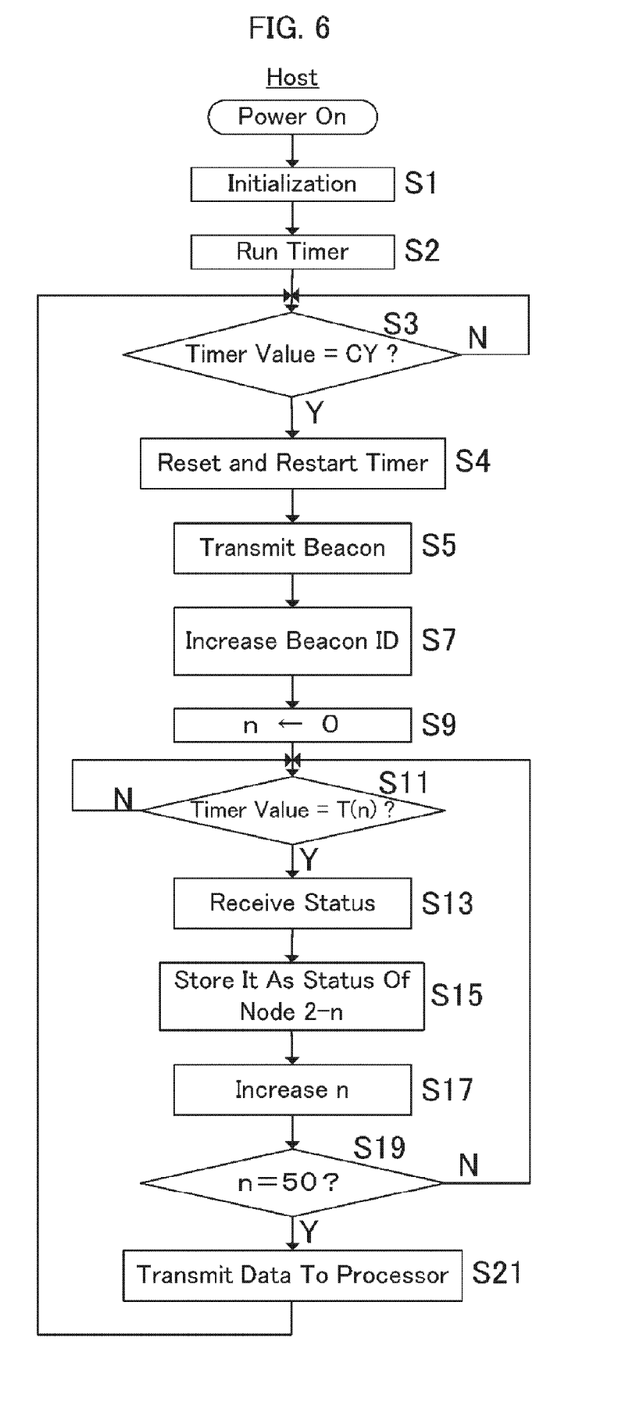
FIG. 6 is a flowchart for showing processing of the host 27 of FIG. 2.

FIG. 6 is a flowchart for showing processing of the host 27 of FIG. 2. Referring to FIG. 6, in step S1, the host 27 initializes various variables and registers. In step S2, the host 27 runs a timer which measures one cycle CY. In step S3, the host 27 determines whether or not a value of the timer reaches the one cycle CY, the process returns to step S3 if it does not reach, conversely the process proceeds to step S4 if it reaches.

Then, in step S4, the host 27 resets the timer and then restarts. In step S5, the host 27 transmits the beacon signal BS including the beacon ID and the group ID to the nodes 2-n. In step S7, the host 27 increases the beacon ID by one. In this case, the beacon ID is an integer which is a serial number. For example, the beacon ID is the integer of 0 to 255, and is reset to 1 after 255. In step S9, the host 27 assigns 0 to a variable "n".

In step S11, the host 27 determines whether or not the value of the timer reaches the waiting time T (n), the process returns to step S11 if it does not reach, conversely the process proceeds to step S13 if it reaches. Then, in step S13, the host 27 receives the status signal NSn transmitted by the node 2-n. In step S15, the host 27 stores the received status signal NSn as the status signal NSn of the node 2-n. In step S17, the host 27 increases the variable "n" by one.

In step S19, the host 27 determines whether or not the value of the variable "n" reaches 50, the process returns to step S11 if it does not reach, conversely the process proceeds to step S21 if it reaches. Then, in step S21, the host 27 transmits the status signals NSn of all the nodes 2-n as stored to the processor 23. Then, the process proceeds to step S3.

Figure 7:
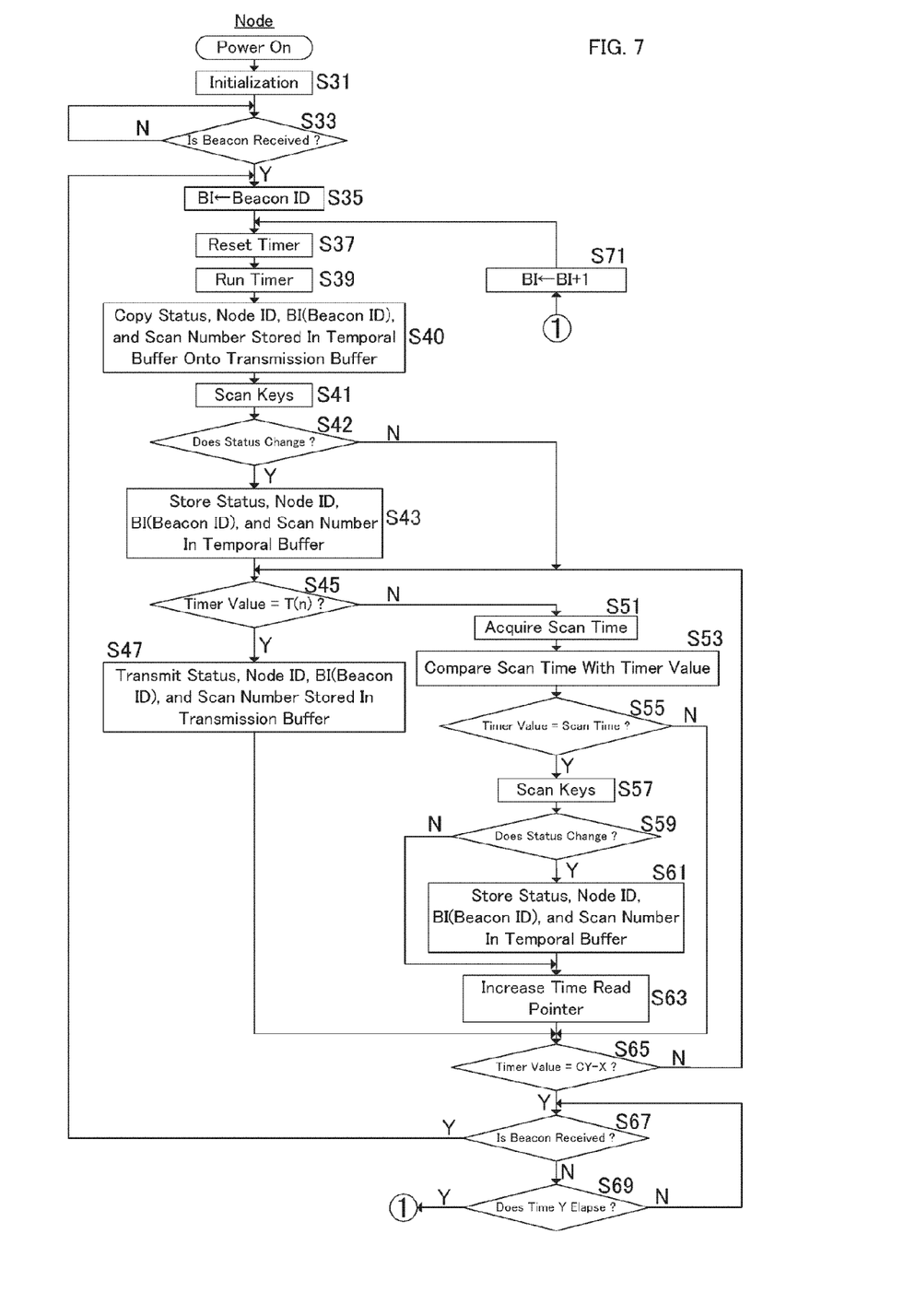
FIG. 7 is a flowchart for showing processing of the node 2-n of FIG. 2.

FIG. 7 is a flowchart for showing processing of the node 2-n of FIG. 2. Referring to FIG. 7, in step S31, the node 2-n initializes various variables and registers. In step S33, the node 2-n determines whether or not the beacon signal BS is received from the host 27, the process proceeds to step S33 if it is not received, conversely the process proceeds to step S35 if it is received. Then, in step S35, the node 2-n assigns the beacon ID included in the received beacon signal BS to a variable BI.

The node 2-n resets a timer which measures one cycle CY in step S37, and runs the timer in step S39.

In step S40, the node 2-n copies the status information, the node ID, the value of the variable BI, and the scan number stored in the temporal buffer of the internal memory 4 onto the transmission buffer. Incidentally, in this way, since the data stored in the temporal buffer is copied onto the transmission buffer at the head of the cycle CY, the final data, which is stored in the temporal buffer in the previous cycle CY, is copied onto the transmission buffer. Also, since the beacon ID is also information for identifying the corresponding cycle CY, the variable BI, which stores the beacon ID in step S35 or S71, is information for identifying the current cycle CY.

In step S41, the node 2-n scans the switches sw1 to sw4. Then, in step S42, the node 2-n compares the status information stored in the temporal buffer with the status information obtained as the result of the current key scan. As the result of the comparison, when the status information changes, the node 2-n proceeds to step S43 so as to rewrite the data stored in the temporal buffer, conversely when the status information does not change, the process proceeds to step S45 after skipping step S43 so as to maintain the data stored in the temporal buffer.

In step S43, the node 2-n rewrites the status information, the node ID, the value of the variable BI, and the scan number stored in the temporal buffer to the latest status information as the result of the key scan in step S41, the node ID, the value of the variable BI which id updated in step S35 or S71 and represents the current cycle CY, and the scan number 0 which represents the key scan time ST0 in step S41.

After "NO" in step S42, or after step S43, in step S45, the node 2-n determines whether or not the value of the timer reaches the waiting time T (n). The node 2-n proceeds to step S47 so as to transmit the status signal NSn if it reaches, conversely the process proceeds to step S51 so as to perform the key scan if it does not reach.

In step S47 after "YES" in step S45, the node 2-n transmits the status information, the node ID, the value of the variable BI, and the scan number copied onto the transmission buffer in step S40 to the host 27 to proceed to step S65.

On the other hand, in step S51 after "NO" in step S45, the node 2-*n* refers to a time table of the internal memory 4 to acquire the scan time indicated by a time read pointer (see step S63). The time table stores the time ts from the scan time ST0 to ST1, the time 2 ts from the scan time ST0 to ST2, and the time 3 ts from the scan time ST0 to ST3 in number order, and the time read pointer indicates any one of them. Incidentally, the time read pointer indicates the time ts after the time 3 ts.

In step S53, the node 2-*n* compares the value of the timer with the scan time as acquired. Then, in step S55, the node 2-*n* proceeds to step S57 so as to perform the key scan if the value of the timer reaches the scan time, otherwise the process proceeds to step S65.

In step S57, node 2-*n* scans the switches sw1 to sw4. Then, in step S59, the node 2-*n* compares the status information stored in the temporal buffer with the status information as the result of the current key scan. As the result of the comparison, when the status information changes, the node 2-*n* proceeds to step S61 so as to rewrite the data stored in the temporal buffer, conversely when the status information does not change, the process proceeds to step S63 after skipping step S61 so as to maintain the data stored in the temporal buffer.

In step S61, the node 2-*n* rewrites the status information, the node ID, the value of the variable BI, and the scan number stored in the temporal buffer to the latest status information as the result of the key scan in step S57, the node ID, the value of the variable BI which is updated in step S35 or S71 and represents the current cycle CY, and the scan number (any one of 1 to 3) which represents the key scan time (any one of ST1 to ST3) in step S57.

After "NO" in step S59 or after step S61, in step S63, the node 2-*n* increases the time read pointer.

After step S47, after "NO" in step S55, or after step S63, in step S65, the node 2-*n* determines whether or not the value of the timer reaches time (CY-X). The time CY is time corresponding to one cycle, e.g., 45 ms. The time X is a constant, e.g., 0.3 ms. In this way, the constant X is a imperceptible time in comparison with the time CY. When it reaches the time (CY-X), the node 2-*n* determines that it is the time when the next beacon signal BS is transmitted, i.e., the current cycle CY comes to the end soon to proceed to step S67, conversely when it does not reach the time (CY-X), the process proceeds to step S45 so as to transmit the status signal NSn (step S47) or perform the key scan (steps S51 to S63).

In step S67 after "YES" in step S65, the node 2-*n* determines whether or not the next beacon signal BS is received, if it is received, the process proceeds to step S35 to update the variable BI, conversely the process proceeds to step S69 if it is not received. In step S69, the node 2-*n* determines whether or not a time Y elapses after a point of time when "YES" is determined in step S65. The time Y is a constant, e.g., 1 ms. When the time Y elapses, the node 2-*n* determines that the reception of the beacon signal BS is failed and then proceeds to step S71, conversely when the time Y does not elapse, the process returns to step S67 to wait for the beacon signal BS.

In step S71, the node 2-*n* increases the value of the variable BI by one and then proceeds to step S37. Because, since it is determined in step S69 that the reception of the beacon signal BS is failed, the beacon ID can not be acquired from the beacon signal BS, and therefore the node 2-*n* has to generate the beacon ID in itself. That is, the process in step S71 corresponds to process for generating the beacon signal BS anew when the beacon signal BS is not received. Incidentally, as described above, since the beacon ID is a serial number, the beacon ID to be included in the beacon signal BS to be originally received can be predicted and thus generated.

Figure 8:
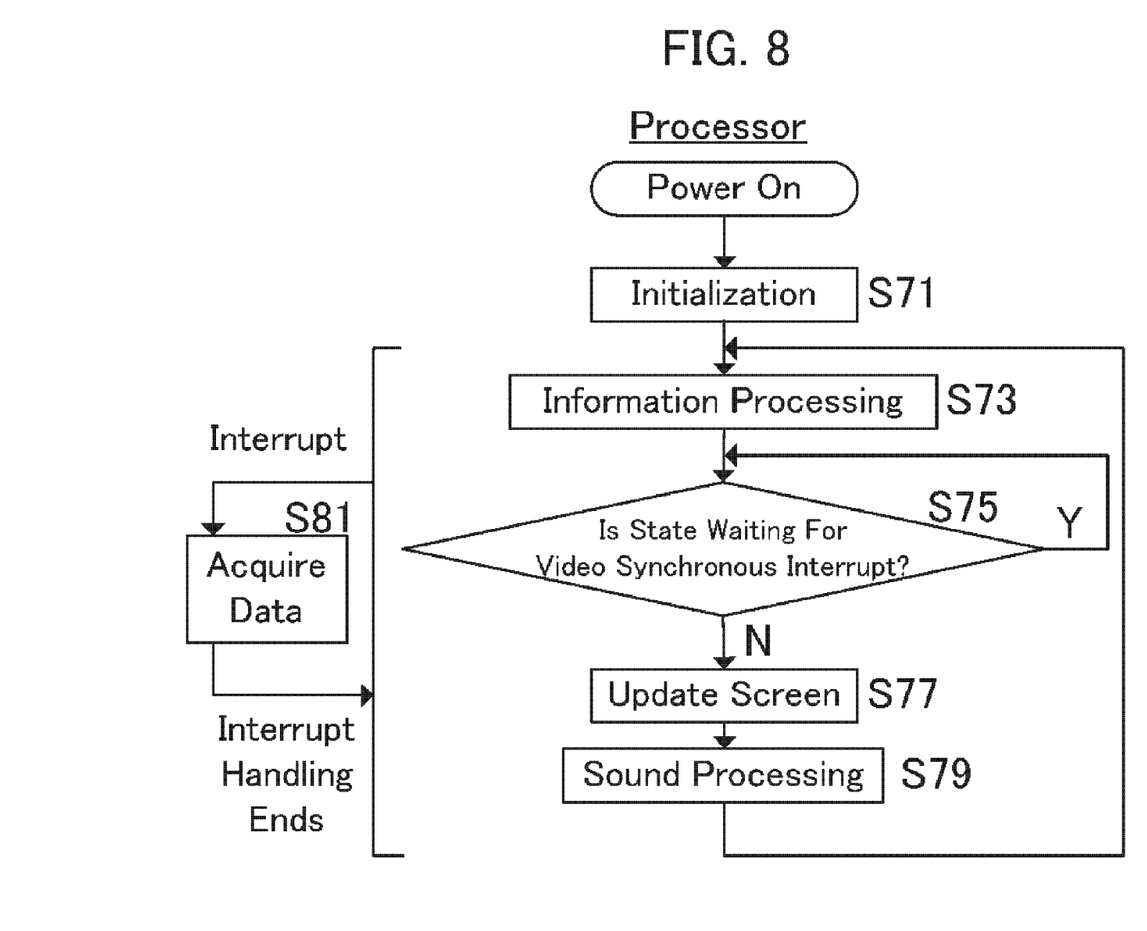
FIG. 8 is a flowchart for showing processing of the processor 23 of FIG. 2.

FIG. 8 is a flowchart for showing processing of the processor 23 of FIG. 2. Referring to FIG. 8, the processor 23 initializes the system in step S71. In step S81, the processor 23 executes the process of acquiring data (status signals NSn), which the host 27 receives from the nodes 2-0 to 2-49 and outputs, as the interrupt processing.

In step S73, the processor 23 performs information processing according to the application program stored in the external memory 25. The information processing includes various arithmetic operations, such as control of pictures and sound for having each operator perform the training tasks, the detection of the input operation of each operator, and determination of a true or false. In this case, the processor 23 utilizes the data acquired in step S81 for detecting the input operation of the each operator.

In step S75, the processor 23 determines whether or not an interrupt based on a video system synchronous signal is waited for, the process returns to step S75 if the interrupt is waited for, conversely if the interrupt is not waited for, i.e., the interrupt based on the video system synchronous signal is issued, the process updates the picture to be displayed on the television monitor 11 in step S77, and performs the sound processing in step S79, such as guide voice and sound effect, and then proceeds to step S73.

By the way, as described above, in the present embodiment, while each node 2-*n* transmits the status information of the switches sw1 to sw4 in response to the beacon signal BS transmitted in the cycle CY, since the plurality of times of the detecting processing (in the above example, four times) is performed while changing time during one cycle, the host 27 and the processor 23 can recognize at which point of time during the one cycle the detecting processing detects the change of the status information. Besides, in the case where the detecting processing is performed once during the one cycle (e.g., at the time when the beacon signal BS is received), the cycle in which the change of the status information is detected is just recognized, i.e., the recognition is made only in units of a cycle.

In accordance with the present embodiment, since it is possible to recognize, for each node 2-*n*, a cycle in which the detecting processing detects the change of the status information and a point of time in the cycle at which the change is detected, the host 27 and the processor 23 can finely detect the order of the changes of the status information among the plurality of the nodes 2-*n* (the order of the depressions of the switches sw). Besides, in the case where the detection processing is performed once time in one cycle, the order of the changes is just recognized in units of a cycle.

In the above example, by means of the scan number, the host 27 and the processor 23 can recognize at which point of time during one cycle the node 2-*n* detects the change of the status information. Also, the beacon ID is information for identifying the beacon signal BS. Moreover, the beacon signal BS is transmitted in the cycle CY. Accordingly, the cycle can be identified by the beacon ID. As the result, by means of the beacon ID, the host 27 and the processor 23 can recognize the cycle in which the node 2-*n* detects the change of the status information. In the above example, the cycle is identified by the variable BI in view of the case where the beacon signal BS is not received.

Also, in the present embodiment, since the status information, the variable BI (beacon ID), and the scan number stored in the temporal buffer are updated when the change of the status information of the switches sw1 to sw4 is detected, the status information, the value of the variable BI, and the scan number transmitted by the node 2-*n* are always information at a point of time at which the status information changes regardless of the past change and the current change. Accordingly, even if the host 27 can not correctly receive the status information, the variable BI, and the scan number from the node 2-$n$ due to the communication error, by means of the value of the variable BI and the scan number transmitted next by the node 2-$n$, the host 27 and the processor 23 can recognize a cycle in which the status information changes and a point of time in the cycle at which the status information changes. As the result, even if the communication error occurs, the host 27 and the processor 23 can correctly detect the order of the changes of the status information among the plurality of the nodes 2-$n$ (e.g., the order of the depressions of the switches sw).

For example, it is assumed that the status information of the first cycle changes in the next second cycle, and the status information, the variable BI, and the scan number stored in the temporal buffer are updated in the second cycle. Also, it is assumed that the status information of the second cycle does not change in the next third cycle, and the status information, the variable BI, and the scan number stored in the second cycle are maintained. Then, it is assumed that the host 27 can not correctly the status information, the variable BI, and the scan number to be received in the second cycle. However, the host 27 and the processor 23 can recognize that a time when the status information changes is in the second cycle by means of the variable BI transmitted in the third cycle, and recognize at which time during the second cycle the status information changes by means of the scan number transmitted in the third cycle.

Also, even if the host 27 can not correctly receive the status information, the variable BI, and the scan number from the node 2-$n$ due to the communication error, by means of the value of the variable BI and the scan number transmitted next by the node 2-$n$, it is possible to recognize a cycle and a time in the cycle from which the same status information continues.

Further, even if the node 2-$n$ can not correctly receive the beacon signal BS due to the communication error, the node 2-$n$ increases the variable BI internally (step S71) to substantially generate the beacon ID. Accordingly, even if the status information changes in the cycle, the generated beacon ID, i.e., the increased value of the variable BI is transmitted together with the status information to the host 27. As the result, even if the communication error occurs, the host 27 and the processor 23 can correctly detect the order of the changes of the status information among the plurality of the nodes 2-$n$ (e.g., the order of the depressions of the switches sw).

Also, even if the node 2-$n$ can not receive the beacon signal BS from the host 27 due to the communication error, by means of the beacon ID generated by the node 2-$n$, i.e., the increased variable BI (step S71), the host 27 and the processor 23 can recognize a cycle from which the same status information continues.

Further, in the present embodiment, even if the node 2-$n$ can not receive the beacon signal BS due to the communication error, since the cycle is maintained inside the node 2-$n$ (steps S69, S71, S37, and S39), it is possible to transmit the status signal NSn to the host 27.

Still further, in the present embodiment, the each node 2-$n$ performs the transmission process after the different waiting time T (n) assigned to each node 2-$n$ elapses from when the beacon signal BS is received. As the result, the host 27 can receive the status signal NSn from the each node 2-$n$ without cross talk.

Meanwhile, the present invention is not limited to the above embodiments, and a variety of variations and modifications may be effected without departing from the spirit and scope thereof, as described in the following exemplary modifications.

(1) In the above case, the processor 23 and the RF module 27 are incorporated in the cartridge 5. However, these may be separately disposed. For example, the RF module 27 may be disposed separately from the cartridge 5, and then it may be connected with the cartridge 5.

(2) In the above case, the key scan is performed four times during one cycle. However, the number of times of the scans is not limited thereto if it is multiple times (two times or more), and therefore can be optionally set.

(3) In the above case, the status information is the ON/OFF information of the switches sw. However, the status information may be the other detection information, such as operation information of an analog stick (joystick). That is, any kind of the input device 1-$n$ may be used so far as it has the above communication function. For example, a game controller, a microphone, a camera, a pointing device, an input device with a gyroscope, an input device with an acceleration sensor, a scale, a body fat scale, a blood-pressure gauge, a pedometer, and so forth which have the above communication function may be used as the input device 1-$n$. Also, in the above case, the operation information of the input device 1-$n$ is transmitted. However, as mentioned above, since a kind of the input device 1-$n$ is not limited, detection information depending on the kind thereof (e.g., an audio signal, an image signal, result of image analysis, coordinate information, measurement information (angular velocity, acceleration, weight, body fat, blood pressure, the number of steps, and so on), result of processing thereof, and so on) may be transmitted.

(4) In the above case, the training task is displayed on the television monitor 11. However, contents to be displayed are not limited thereto. Also, the number of the switches sw of each input device 1-$n$ may be 1, or the plural number other than 4.

(5) In the above case, the input device 1-$n$ which the operator operates with his/her hand is used. However, an input device (e.g., including a single foot-switch or a plurality of foot-switches) which the operator operates (presses down) with his/her feet may be used. Also, the both may be used.

While the present invention has been described in terms of embodiments, it is apparent to those skilled in the art that the invention is not limited to the embodiments as described in the present specification. The present invention can be practiced with modification and alteration within the spirit and scope which are defined by the appended claims.

What is claimed is:

1. A group response detecting system, comprising:
a plurality of nodes to be assigned to a plurality of operators, said each node detects input of the corresponding operator to transmit detection information in a wireless manner; and
a host operable to receive the detection information transmitted by said each node,
wherein said host transmits a predetermined signal to said plurality of the nodes in a predetermined cycle, the predetermined signal including information (hereinafter referred to as "signal identification information") for identifying the predetermined signal,
wherein said each node includes:
a detection unit operable to perform detecting processing of the input a plurality of times while changing time during the one cycle, and
a transmitter operable to transmit information to said host, in response to the predetermined signal, the information including the detection information, and information (hereinafter referred to as "time point information") indicating at which point of time during the one cycle the detecting processing detects the detection information, a storage unit operable to store the detection information associated with the signal identification information and the time point information, wherein when the detection unit detects change of the detection information, said storage unit rewrites the detection information, the signal identification information, and the time point information as stored to the detection information as changed, and the signal identification information and the time point information included in the predetermined signal in the cycle in which the change is detected, and wherein said transmitter transmits the detection information, the signal identification information, and the time point information as stored in the storage unit to said host in response to the predetermined signal.

2. A group response detecting system as claimed in claim 1, wherein said each node further includes an identification information generation unit operable to generate the signal identification information anew based on the signal identification information included in the predetermined signal as received previously when the predetermined signal is not received, and wherein when the detection unit detects the change of the detection information during the cycle in which the predetermined signal is not received, said storage unit rewrites the detection information, the signal identification information, and the time point information as stored to the detection information as changed, the signal identification information generated by said identification information generation unit, and the time point information.

3. An input device, comprising:
a node as claimed in claim 2.

4. A communication control device, comprising:
a host as claimed in claim 2.

5. A group response detecting system as claimed in claim 1, wherein said each node further includes a maintenance unit operable to maintain the predetermined cycle substantially when the predetermined signal is not received, and wherein said transmitter performs transmitting processing based on the cycle maintained by said maintenance unit when the predetermined signal is not received.

6. An input device, comprising:
a node as claimed in claim 5.

7. A communication control device, comprising:
a host as claimed in claim 5.

8. A group response detecting system as claimed in claim 1, wherein said transmitter of said each node performs transmitting processing after a different time period assigned to said each node elapses from when the predetermined signal is received.

9. An input device, comprising:
a node as claimed in claim 8.

10. A communication control device, comprising:
a host as claimed in claim 8.

11. An input device, comprising:
a node as claimed in claim 1.

12. A communication control device, comprising:
a host as claimed in claim 1.

13. A group response detecting system, comprising:
a plurality of nodes to be assigned to a plurality of operators, said each node detects input of the corresponding operator to transmit detection information in a wireless manner; and a host operable to receive the detection information transmitted by said each node, wherein said host transmits a predetermined signal to said plurality of the nodes in a predetermined cycle, wherein the predetermined signal includes information (hereinafter referred to as "signal identification information") for identifying the predetermined signal, and wherein said each node includes:
a detection unit operable to perform detecting processing of input during the one cycle, a storage unit operable to store the detection information associated with the signal identification information, and a transmitter operable to transmit the detection information and the signal identification information stored in said storage unit to said host in response to the predetermined signal, wherein when said detection unit detects change of the detection information, said storage unit rewrites the detection information and the signal identification information as stored to the detection as changed and the signal identification information included in the predetermine signal in the cycle in which the change is detected.

14. A group response detecting system as claimed in claim 13, wherein said each node further includes a identification information generation unit operable to generate the signal identification information anew based on the signal identification information included in the predetermined signal as received previously when the predetermined signal is not received, and wherein when the detection unit detects the change of the detection information during the cycle in which the predetermined signal is not received, said storage unit rewrites the detection information and the signal identification information as stored to the detection information as changed and the signal identification information generated by said identification information generation unit.

15. A group response detecting system as claimed in claim 14, wherein when the predetermined signals are not received in series, said identification information generation unit generates the signal identification information anew based on the signal identification information as generated previously.

16. An input device, comprising:
a node as claimed in claim 15.

17. A communication control device, comprising:
a host as claimed in claim 15.

18. An input device, comprising:
a node as claimed in claim 14.

19. A communication control device, comprising:
a host as claimed in claim 14.

20. An input device, comprising:
a node as claimed in claim 13.

21. A communication control device, comprising:
a host as claimed in claim 13.

* * * * *